(12) United States Patent
Lyle et al.

(10) Patent No.: US 12,131,325 B1
(45) Date of Patent: Oct. 29, 2024

(54) NETWORK ACCOUNT SECURITY

(71) Applicant: United Services Automobile Association (USAA), San Antonio, TX (US)

(72) Inventors: Ruthie D. Lyle, Durham, NC (US); Bharat Prasad, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/139,044

(22) Filed: Apr. 25, 2023

Related U.S. Application Data

(63) Continuation of application No. 16/166,587, filed on Oct. 22, 2018, now abandoned.

(60) Provisional application No. 62/576,177, filed on Oct. 24, 2017.

(51) Int. Cl.
*G06Q 20/40* (2012.01)
*G06Q 20/10* (2012.01)
*G06Q 20/22* (2012.01)

(52) U.S. Cl.
CPC ....... *G06Q 20/401* (2013.01); *G06Q 20/1085* (2013.01); *G06Q 20/223* (2013.01)

(58) Field of Classification Search
CPC . G06Q 20/401; G06Q 20/1085; G06Q 20/223
See application file for complete search history.

(56) References Cited

U.S. PATENT DOCUMENTS

| | | | |
|---|---|---|---|
| 5,731,575 A | 3/1998 | Zingher et al. | |
| 7,152,045 B2 | 12/2006 | Hoffman | |
| 8,660,970 B1 | 2/2014 | Fiedorowicz | |
| 8,750,853 B2 | 6/2014 | Abramson et al. | |
| 10,110,385 B1 * | 10/2018 | Rush | H04L 9/3234 |
| 10,558,740 B1 | 2/2020 | O'Malley et al. | |
| 11,157,906 B1 | 10/2021 | Smith et al. | |
| 2004/0127231 A1 | 7/2004 | Dor et al. | |
| 2006/0028556 A1 | 2/2006 | Bunn et al. | |

(Continued)

OTHER PUBLICATIONS

Martino, MJ, "Alert Pin for Personal Banking Terminals," dated Mar. 19, 2005, IBM, https://priorart.ip.com/IPCOM/000104652 (Year: 2005).*

(Continued)

*Primary Examiner* — Raven E Yono
(74) *Attorney, Agent, or Firm* — Fish & Richardson P.C.

(57) ABSTRACT

Methods and systems for account access security at a network access device. The method includes receiving data indicating that a particular user has initiated a particular request at an access point; obtaining sensor data that is generated by one or more sensors of the access point proximate to a time that the particular user initiated the particular request; classifying the particular request as a particular type of request; in response to determining that the particular request is classified as the particular type of request, initiating an exception processing mode in which requests that are initiated by the users at the access point result in the generation and output of inaccurate completion data to mimic completion of the request; processing the particular request using the exception processing mode; and providing the inaccurate completion data generated by the access point for the particular request.

20 Claims, 5 Drawing Sheets

(56) References Cited

U.S. PATENT DOCUMENTS

| | | | |
|---|---|---|---|
| 2006/0089837 A1 | 4/2006 | Adar et al. | |
| 2007/0106517 A1* | 5/2007 | Cluff | G10L 17/10 |
| | | | 704/E17.009 |
| 2009/0002178 A1 | 1/2009 | Guday et al. | |
| 2013/0091561 A1 | 4/2013 | Bruso et al. | |
| 2013/0234825 A1 | 9/2013 | Malhotra et al. | |
| 2013/0331132 A1 | 12/2013 | Goliszewski et al. | |
| 2014/0081858 A1 | 3/2014 | Block et al. | |
| 2015/0066764 A1 | 3/2015 | Crowell et al. | |
| 2015/0293504 A1 | 10/2015 | Blum et al. | |
| 2016/0232769 A1 | 8/2016 | Jarvi et al. | |
| 2016/0253458 A1 | 9/2016 | Balwani | |
| 2017/0140376 A1 | 5/2017 | Carraway et al. | |
| 2017/0309196 A1 | 10/2017 | Vangala et al. | |
| 2018/0124242 A1 | 5/2018 | Zimmerman | |
| 2018/0174146 A1* | 6/2018 | Bansal | G06Q 20/40145 |
| 2018/0197181 A1* | 7/2018 | Kurian | G07F 7/1025 |
| 2018/0247483 A1 | 8/2018 | Lindsay | |
| 2019/0052661 A1 | 2/2019 | Anand | |
| 2020/0234299 A1* | 7/2020 | Lambert | G06Q 20/405 |
| 2020/0244650 A1 | 7/2020 | Burris et al. | |
| 2020/0387903 A1* | 12/2020 | Wright | G06Q 20/4012 |
| 2021/0350346 A1* | 11/2021 | Edwards | G06Q 20/1085 |

OTHER PUBLICATIONS

Sufian Hameed, "SafePass: Authentication under Duress for ATM Transactions," dated Feb. 10, 2014, IEEE, https://ieeexplore.IEEE.org/document/6725317?source=IQplus (Year: 2014).*

US Final Office Action in United States U.S. Appl. No. 16/166,587, dated Nov. 27, 2020, 24 pages.

US Final Office Action in United States U.S. Appl. No. 16/166,587, dated Oct. 26, 2022, 21 pages.

US Non-Final Office Action in United States U.S. Appl. No. 16/166,587, dated Apr. 11, 2022, 36 pages.

US Non-Final Office Action in United States U.S. Appl. No. 16/166,587, dated Jun. 9, 2020, 22 pages.

US Non-Final Office Action in United States U.S. Appl. No. 16/166,587, dated Nov. 15, 2021, 26 pages.

US Response to Final Office Action in United States U.S. Appl. No. 16/166,587, dated Nov. 27, 2020, on Feb. 8, 2021, 15 pages.

US Response to Final Office Action in United States U.S. Appl. No. 16/166,587, dated Oct. 26, 2023, on Feb. 22, 2022, 13 pages.

US Response to Non-Final Office Action in United States U.S. Appl. No. 16/166,587, dated Apr. 11, 2022, on Jul. 11, 2022, 18 pages.

US Response to Non-Final Office Action in United States U.S. Appl. No. 16/166,587, dated Jun. 9, 2020, on Aug. 26, 2020, 11 pages.

US Response to Non-Final Office Action in United States U.S. Appl. No. 16/166,587, dated Nov. 15, 2021, on Feb. 2, 2022, 13 pages.

* cited by examiner

NETWORK ACCOUNT SECURITY

CROSS-REFERENCE TO RELATED APPLICATIONS

This application is a continuation application of and claims priority under 35 U.S.C. § 120 to U.S. application Ser. No. 16/166,587, filed on Oct. 22, 2018, which claims benefit under 35 U.S.C. § 119 to U.S. Application Ser. No. 62/576,177, filed on Oct. 24, 2017. The entire contents of each applications are incorporated herein by reference.

BACKGROUND

Mobile device users have access to a large number and variety of mobile applications. Such applications enable a user to engage in various activities, access information, request services, or perform other actions that, in the past, may have required the user to interact in person or by telephone call with a store clerk, customer service representative, or other individual. Although mobile applications may provide convenient and efficient ways to access services, such ready access may also cause problems with respect to unauthorized access to personal data, financial data, and/or other types of sensitive, confidential information.

SUMMARY

Implementations of the present disclosure are generally directed to managing the presentation of account information through a user interface, based at least partly on biometric data collected from a user. More specifically, implementations are directed to generating sensor data, such as biometric data regarding the user, analyzing the sensor data to determine that the user is currently under duress, and altering the presentation of the user's account information through the user interface of a portable computing device, automated teller machine, and/or other interface, based at least partly on the detection of a state of duress.

In general, innovative aspects of the subject matter described in this specification can be embodied in methods that includes operations of: receiving a request that is submitted by a user through a user interface (UI) executing on a computing device, the request to present account information for at least one account associated with a user; receiving biometric data that is generated by at least one biometric sensor device, the biometric data indicating at least one physiological characteristic of the user during a time period proximal to submission of the request; analyzing the biometric data to determine, based on the at least one physiological characteristic, a state of the user during the time period proximal to the submission of the request; and based on the determined state of the user, providing an altered version of the account information for presentation through the UI executing on the computing device.

Implementations can optionally include one or more of the following features: the operations further include accessing one or more rules that constrain presentation of the account information of the user; the altered version of the account information is generated based on the one or more rules; the one or more rules are specified by the user prior to the submission of the request; the one or more rules specify a threshold level of the at least one physiological characteristic; the state of the user is determined based on the biometric data including a measurement of the at least one physiological characteristic that exceeds the threshold level; providing the altered version of the account information through the UI includes sending the altered version of the account information over at least one network to the computing device executing the UI; the account information describes a plurality of accounts owned by the user; the altered version of the account information omits at least one of the plurality of account owned by the user; the account information describes a balance of the at least one account; the altered version of the account information describes a spoofed balance of the at least one account that is less than the balance; the operations further include sending an alert to at least one other user, the alert indicating the state of the user and the request to present the account information; the operations further include setting a limit on a withdrawal amount that is permitted from the at least one account, responsive to the determining of the state of the user; the computing device executing the UI is an automated teller machine (ATM); the operations further include based on the determined state of the user, preventing, by the at least one processor, at least one transaction requested by the user; and/or the at least one transaction is a withdrawal or a peer-to-peer electronic transfer of funds.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and/or technical improvements compared to previously available solutions. In various situations, a user under duress may be forced (e.g., under threat of violence) to present their account information to a malicious individual or to complete a financial transaction (e.g., a withdrawal or peer-to-peer electronic money transfer), at an automated teller machine (ATM), through their smartphone or other computing device, or at some other interface. This vulnerability of account information security can lead to theft, fraud, and/or other security breaches. By using biometric data to detect situations when a user is under duress, and by altering the presented account information at a user interface when a state of duress is detected, implementations reduce or eliminate the amount of theft, fraud, or other problems that may be caused by unauthorized viewing of account information. Accordingly, implementations avoid the expenditure of processing power, storage space, network bandwidth, active memory, and/or other computing resources that traditional environments expend to recover from instances of theft, fraud, identify theft, data misappropriation, or other types of security breaches. The execution and/or subsequent rolling back of fraudulent transactions may also consume computing resources, and implementations avoid the wasteful consumption of computing resources that would otherwise be caused by executing then backing out such transactions. Further, in instances where the presentation of account information would involve the transmission of data over a network, altering the presentation (when the user is under duress) can prevent such a transmission or reduce the amount of transmitted and presented data, thus reducing network traffic and freeing bandwidth for other communications. Moreover, implementations of the present disclosure prevent unwanted disclosure of personal data, allow computing resources to perform other tasks, reduce data fragmentation, and reduce the consumption of resources that may be caused by the performance of security tasks that would otherwise be performed to combat security risks. In some instances, the detected emotional distress information could also be provided to third parties, such as law enforcement, family members, friends, joint account holders, and so forth, to enable follow up actions and/or assistance to be provided by such parties.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are directed to systems, devices, methods, and computer-readable media for altering the presentation of account information through a user interface (UI), based on detecting that a user is in a state of duress. Biometric data is collected for a user using one or more sensor devices in proximity to the user. The biometric data may describe a current physiological state of the user at the time when the data is collected, and may include measurements of various biometric characteristics such as the user's heart rate, pulse, galvanic skin response, perspiration level, eye movement, body movements (e.g., fidgeting, twitching, etc.), pupil dilation, respiration rate, neural activity (e.g., brain wave activity), and so forth. On receiving an indication that the user has requested a presentation of account information through a UI, such as their smartphone, an automated teller machine (ATM), and so forth, the biometric data is collected and analyzed to determine whether the user is experiencing a state of duress when requesting the presentation of the account information. Such a state of duress may indicate that the user is being threatened by a malicious individual (e.g., in-person at an ATM) and, in response to the duress determination, the account information presented through the UI is altered. Such altering may be performed to portray a fictional financial state of the user, in which the user is depicted as having fewer assets and/or a lower balance in their account(s) than the user actually has. Accordingly, a malicious individual who is threatening the user may not learn the true extent of the user's assets and, thus, the losses due to theft may be reduced.

In some implementations, the alteration of the presented account information may be governed by constraint rules that are specified by the user, another individual associated with the user (e.g., parent, family member, legal guardian, etc.), and/or the (e.g., financial) institution that manages the account(s) for the user. In addition to altering the presented account information, various other action(s) may be performed in response to the determination that the user is under duress. Such other action(s) may also be governed by the constraint rule(s), and may include sending a notification to one or more interested parties (e.g., the financial institution, police, the user's emergency contact person, health care providers, family members, etc.) indicating that the user is under duress and requesting a presentation of account information. The action(s) may also include limiting the amount of funds that the user is able to withdraw from the account(s), to further limit the amount of loss that may be incurred in the potential theft situation.

Figure 1A:
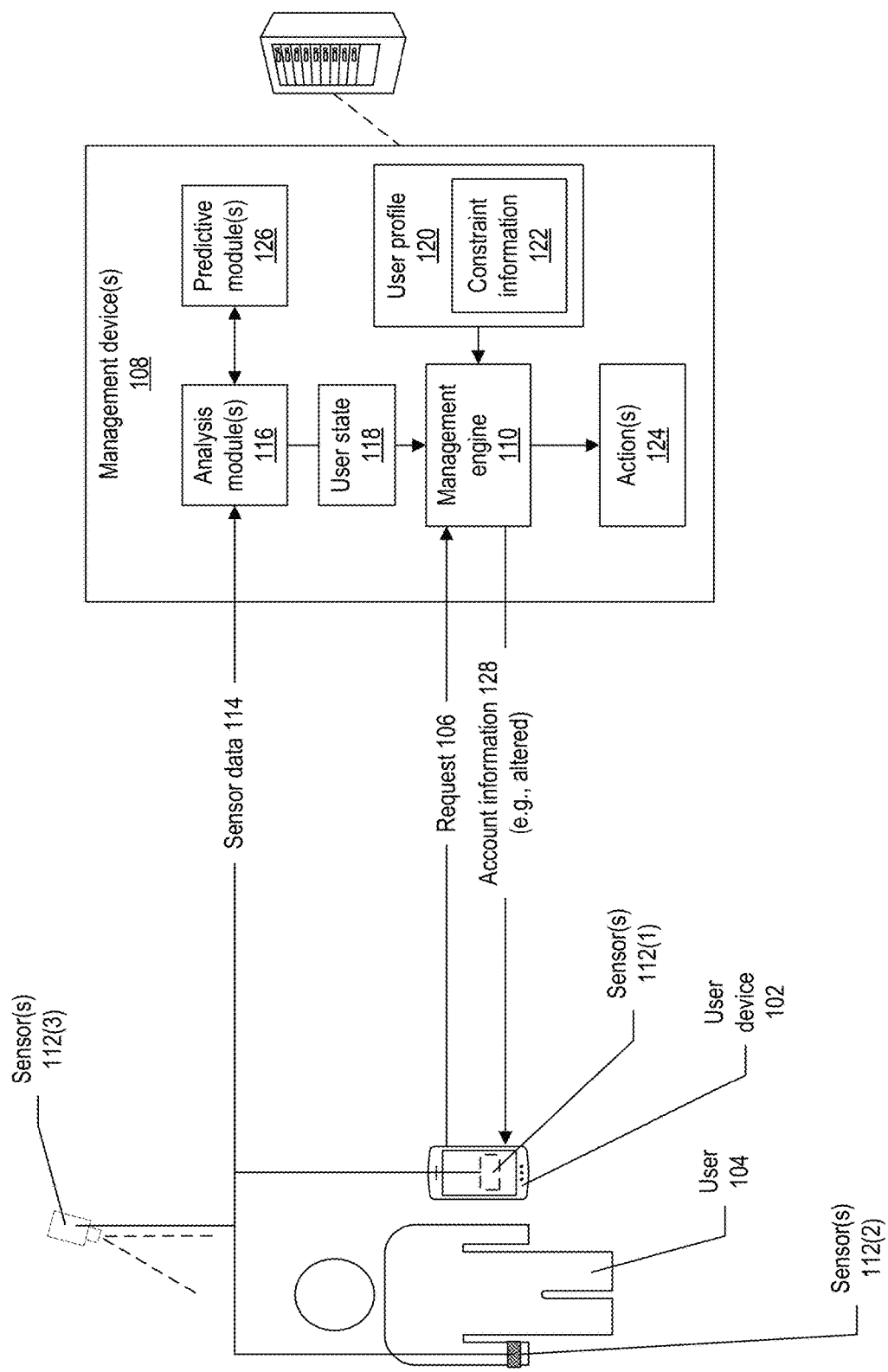
FIGS. 1A and 1B depict example systems for managing the presentation of account information based on biometric data, according to implementations of the present disclosure.
Figure 1B:
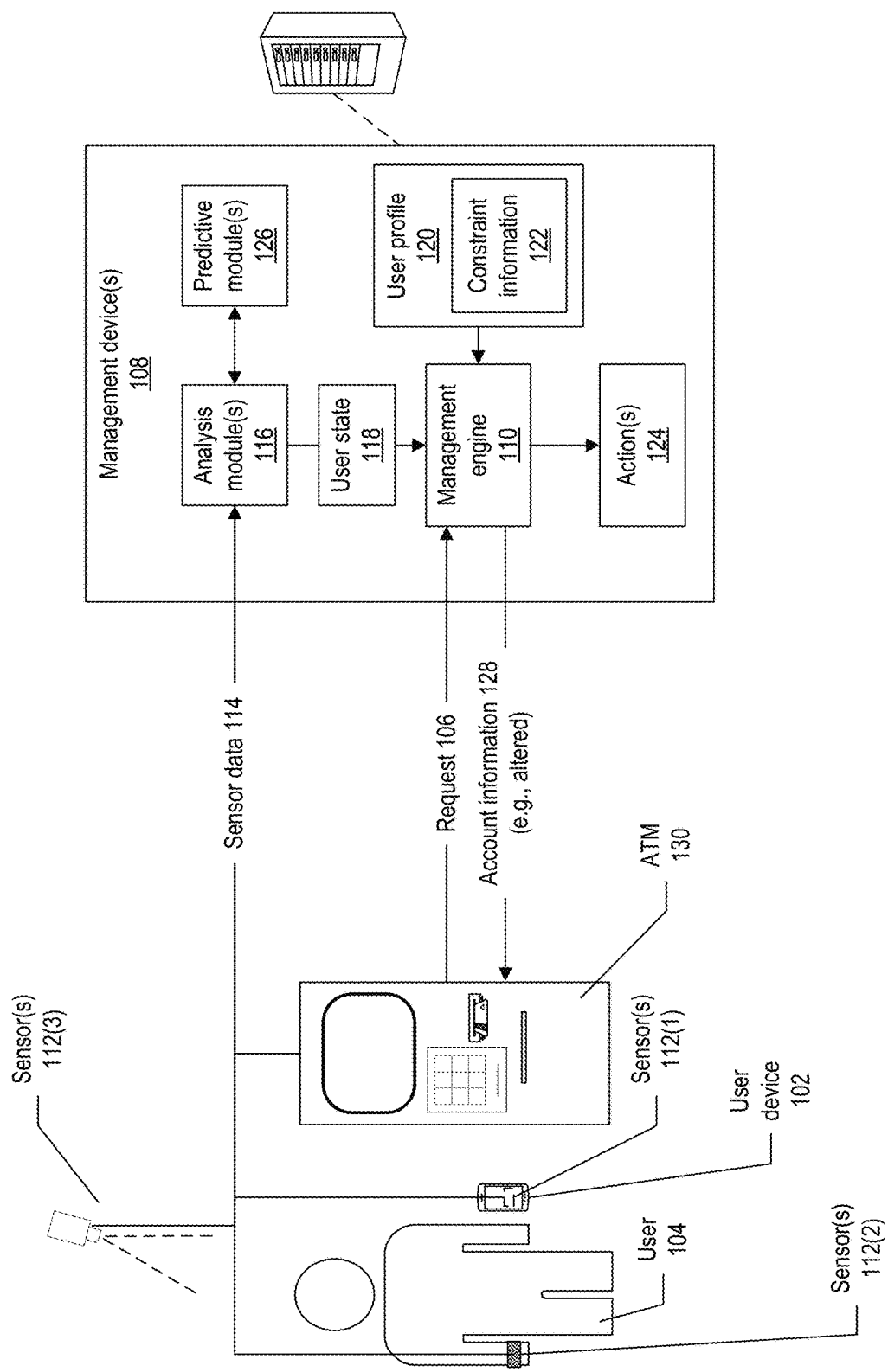

FIGS. 1A and 1B depict example systems for managing account information presentation based on biometric sensor data and/or constraint information, according to implementations of the present disclosure. As shown in the examples, the system may include a user device 102. The user device 102 may be any appropriate type of computing device. In some examples, the user device 102 is a mobile and/or portable computing device, such as a smartphone, tablet computer, wearable computer, smart glass, vehicle onboard system and so forth. The user device 102 may also be a less mobile device, such as a desktop computer, laptop computer, smart appliance, smart television, internet-of-things (IoT) device, gaming console, and so forth. The user device 102 may be owned by, operated by, and/or otherwise associated with a user 104.

As shown in FIG. 1A, the user 104 submits a request 106 for account information 128 to be presented on the user device 102. A request 106 may be to view a balance and/or transaction history of one or more accounts that are owned by the user 104 and managed by an institution. In some examples, the account(s) include financial account(s) such as a bank account, an investment account, a line of credit (e.g., credit card account or other loan), and so forth, the account(s) managed by a financial institution such as a bank.

The request 106 may also be a request to access other types of information and/or request the performance of actions. For example, the request 106 may be an initiation of the transaction, an attempt to perform the transaction, and/or a transmission of a communication indicating a transaction to be performed. In some examples, the transaction 106 may be a purchase of product(s) or service(s). A transaction may be a financial transaction, such as a funds transfer from a financial account (e.g., bank account) of the user 104 to another entity, or between accounts of the user 104. The transaction may be an action requested by the user 104 to manage a financial account management, such as opening or closing a bank account, granting permission to access account information, and so forth. In some examples, the transaction 106 is an action requested to manage an investment account, such as a liquidation of an investment fund or the sale or purchase of stocks, bonds, or other types of investments. In general, a transaction may involve the user 104 requesting the transferring of funds or other forms of value to another entity.

The user 104 may employ the user device 102 to send the request 106. For example, the user 104 may access an e-commerce application or web site using the user device 102 and, through the application or web site, submit the request 106 for account information to be presented on the user device 102 or some other device. As another example, the user 104 may employ the user device 102 to access a mobile application (e.g., an app) provided by a financial services company such as a bank, insurance company, and/or investment services company. The request 106 may also be initiated by the user 104 through other channels. For example, the request 106 may be made through a point-of-sale (POS) terminal at a merchant, as part of a credit card and/or debit card transaction. The request 106 may also be submitted through an ATM, as shown in the example of FIG. 1B.

The request 106 may be communicated over one or more networks to a management engine 110 executing on one or more management devices 108. The management device(s) 108 may include any appropriate number and type of computing devices, such as server device(s), distributed computing device(s) (e.g., cloud computing server(s)), and so forth. In some examples, the management engine 110 may handle at least a portion of the request 106, by retrieving the account information 128 from the appropriate institutional databases and/or servers, altering the account information 128 as described herein, and communicating the account information 128 back to the requesting device for presentation thereon. In some examples, the request 106 may be handled by other external systems and/or services. In such examples, the management engine 110 may receive the account information 128 from the other systems and/or services and perform the alteration to provide the altered account information 128 to the requesting device.

The system may include and utilize any appropriate number of sensors 112, also described as sensor device(s). The sensor(s) 112 may be in proximity to the user 104 and may be configured to generate sensor data 114 regarding the user 104. The generation of data, such as sensor data, may include the collection of the data by sensor device(s) 112. The generation of data may also include the determination of the data based on collected sensor data, such that the generated data is the output of the processing of the collected sensor data. The sensor data 114 may include biometric data that describes physiological and/or other characteristics of the user 104. The sensor data 114 may also describe the environment near the user 104, such as lighting conditions, weather conditions, location, and so forth. In some implementations, the user device 102 may include one or more sensors 112(1). For example, the sensor(s) 112(1) may include camera(s) or other imaging device(s) configured to generate image(s) and or video of the user's face or other body parts. The sensor(s) 112(1) may also include microphone(s) or other audio input device(s) configured to capture and/or record audio data such as the user's speech, heartbeat, or other sounds of the user 104 and/or sounds from the user's proximal environment. The sensor data 114 may also describe oxygen level, the presence and/or concentration of other gases, the presence of alcohol, marijuana, or tobacco, the presence of inhalants or odors, the temperature, the altitude, the air pressure, the humidity, and/or brain waves (e.g., neural activity) of the user 104. The sensor(s) 112(1) may include accelerometer(s), gyroscope(s), or other sensor (s) configured to generate data describing the movement(s) of the user device 102. The sensor(s) 112(1) may include transceiver(s) configured to detect signals that indicate a location of the user device 102. For example, the sensor(s) 112(1) may be configured to detect signals from a satellite-based navigation system such as the global positioning system (GPS). The sensor(s) 112(1) may be included in a portable and/or mobile device such as a smartphone, tablet computer, and so forth. The sensor(s) 112(1) may also be included in a wearable computing device such as a wristwatch computing device, smart glasses or headsets, smart contact lenses, virtual reality (VR) devices, and so forth.

The system may also include one or more sensors 112(2) that are carried, worn, and/or otherwise transported by the user 104 but that are external to the user device 102. For example, the sensor(s) 112(2) may be components of smart clothing and/or a wearable fitness device, and may be configured to measure the user's pulse, blood pressure, perspiration level, blood sugar level, brain wave activity, or other physiological characteristic(s) of the user 104. The sensor(s) 112(2) may also include accelerometer(s), gyroscope(s), or other sensor(s) configured to detect movement(s) of the user 104 and/or one or more of the user's various body parts. In some examples, the sensor(s) 112(2) may be embedded and/or implanted in the user 104, e.g., as components of a medical device such as a heart pacemaker, a medical monitor, a medication dispenser, a prosthetics (e.g., smart prosthetic), and/or a device that uses or enables virtual reality. The sensor(s) 112(2) may communicate the sensor data 114 to the user device 102, which may communicate the sensor data 114 to the management device(s) 108. Alternatively, the sensor(s) 112(2) may communicate their sensor data 114 to the management device(s) 108 without using the user device 102 as an intermediary.

The system may also include one or more sensors 112(3) that are in proximity to the user 104 and not carried and/or worn by the user 104. For example, the sensor(s) 112(3) may include one or more cameras or other imaging device(s) that generate image(s) and or video of the user 104 when the user 104 is in proximity to the sensor(s) 112(3). The sensor(s) 112(3) may also include microphone(s) or other audio input device(s) to capture audio data such as speech, heartbeat, and/or other sounds of the user 104, and/or ambient sounds in proximity to the user 104. In some instances, the captured audio data may be stored in memory on the user device 102 or elsewhere. In some instances, the sensor(s) 112(3) may be components of smart appliances, home entertainment systems (e.g., television, stereo, gaming consoles, etc.), and/or internet-of-things (IoT) devices that are in the user's home, workplace, or elsewhere. The sensor(s) 112(3) may be components of an in-vehicle computing device such as an automotive computer or telematics device in a vehicle that is owned and/or employed by the user 104. The sensor(s) 112(3) may have a fixed location, such as a fixed traffic camera. The sensor(s) 112(3) may also have a variable location, such as sensor(s) that are component(s) of a drone, blimp, or other vehicle. In some instances, a sensor 112(3) may be a component of a user device carried by an individual other than the user 104, or may be worn, implanted, or otherwise conveyed by the other individual.

Each of the various types of sensor data 114 described herein may be generated by one or more of the sensor(s) 112(1), 112(2), or 112(3). In some instances, the sensor data 114 includes biometric data that indicates one or more physiological characteristics of the user 104, such as blood pressure, pulse or heart rate, body temperature, perspiration, respiration rate, eye movement, brain wave or neural activity, blood sugar level, changes in skin tone (e.g., due to a flush response indicating a blood pressure change), galvanic skin response, and so forth. The sensor data 114 may indicate one or more bodily movements (e.g., fidgeting, foot tapping, eye movement, etc.) of the user 104, and/or a location of the user 104. The sensor data 114 may also include images and/or video of the user's face, shoulders, or other part(s) of the body. The sensor data 114 may include audio data such as the captured speech, breathing, and/or heartbeat of the user 104. Sensor data 114 may also include image(s), video data, and/or audio data captured from the user's environment, such as images of the user's surroundings, images of objected being manipulated by the user 104, audio data of ambient noise proximal to the user 104, and so forth.

The sensor data 114, and/or other data generated by the user device 102, may be received over one or more networks by one or more analysis modules 116 executing on the management device(s) 108 or elsewhere. The sensor data 114 and/or other data may be analyzed by the analysis module(s) 116 to determine a current user state 118 for the user 104 (e.g., the user's state when they submitted the request 106). The user state 118 may be a physical state indicating that the user 104 is under duress, fatigued, intoxicated, asleep, and so forth. The user state 118 may be a mental state indicating that the user 104 is manic, depressed, experiencing dementia, not lucid, and so forth. The user state 118 may be an emotional state indicating that the user 104 is sad, angry, enraged, happy, and so forth. The user state 118 may include a description of the user's physical, mental, and/or emotional state. The analysis module(s) 116 may employ various techniques to determine the user state 118 based on the sensor data 114 and/or other information.

For example, various techniques may be employed to determine whether the user 104 is under duress. As used herein, a state of duress is one in which the user is, to some extent, fearful for their physical or financial well-being, and/or fearful for the physical and/or financial well-being of someone associated with them (e.g., family member, friend, etc.), and because of that fear the user is being forced to do something that they may not otherwise do. For example, a malicious individual may be holding a gun to the user and threatening harm unless the user displays their account information to the malicious individual, thus causing the user to be in a state of duress. Implementations can employ various types of sensor data, and various techniques, to determine whether the user is in a state of duress. Such techniques may include, but are not limited to, one or more of the following.

Images of at least a portion of the user's face (e.g., mouth, eyes, etc.) and/or posture (e.g., shoulders) may be analyzed using mood recognition analysis techniques to determine the emotional state of the user 104, such as whether the user 104 is stressed, relaxed, happy, sad, angry, calm, scared, and so forth. In some implementations, image(s) of at least a portion of the user's hands, fingers, wrists, and/or arms may also be captured, and gestures made by the user 104 may be analyzed to determine the user's emotional state. For example, an agitated user may gesture differently and/or more dramatically than they would normally. A state of agitation, fear, stress, anger, and/or other emotional states may indicate that the user 104 is under duress.

Images of the user's body may also be captured and analyzed to determine the user's current state of grooming, and/or how or whether the user 104 is currently dressed. For example, it is known that the user 104 typically works during a week day, and the user 104 is dressed in pajamas on a weekday afternoon, such atypical attire may indicate an atypical emotional, mental, or physiological state of the user 104. The grooming state (e.g., hair, facial hair, neatness, cleanliness, etc.) of the user 104 may also be examined to determine the user's state. For example, if the user 104 is normally clean shaven, but image(s) of the user 104 show one or more days' worth of facial hair stubble, that may indicate an atypical emotional, mental, or physiological state of the user 104. The state of the user's hair (e.g., whether or not the hair is combed, tied, or otherwise arranged), whether the user is currently wearing glasses (or contact) lenses, cleanliness (e.g., clean or dirty face, hands, fingernails, etc.), and/or other information may also be determined by analyzing image(s) of the user 104. The user's current state of attire and/or grooming may be compared to a known typical state of attire and/or grooming of the user 104, and that comparison may be used to infer a current (typical or atypical) physical, emotional, and/or mental state of the user 104. For example, if the user is unusually untidy, or in an atypical state of dress, given the time of day and/or day of week, this determination may contribute to a finding that the user is under duress.

Audio data of the voice of the user 104 may be analyzed using audio analysis techniques to detect emotional indicators in the user's voice and/or language usage. Stress or fear indicators in the user's voice may indicate a state of duress.

Audio data of the voice of the user 104 may be transcribed using speech-to-text (STT) software, and the output text may be analyzed using natural language processing (NLP), semantic analysis, keyword recognition, or other methods to detect indications of stress, anger, and/or other emotions in the user's language. The audio data and/or transcribed audio data may also be analyzed to determine whether the user 104 is not lucid, experiencing dementia, or otherwise mentally impaired (e.g., if the user's speech does not make sense). The audio data and/or transcribed audio data may also be analyzed to determine whether the user 104 is intoxicated. The use of certain words or phrases that are atypical for the user to use, and/or atypical grammatical constructs or general incoherence of speech, may indicate the user is under duress.

Analysis of the speech of the user 104 includes, but is not limited to, identification and analysis of the particular words, phrases, and/or sentences spoken by the user 104. Analysis of the user's speech may also include analysis of the tone, clarity, volume, speed, and/or other characteristics of the user's speech that may be captured in the audio data gathered by the audio sensor device(s). Sounds made by the user 104, other than speech, may also be captured and analyzed. For example, the captured and analyzed audio data may include noises inadvertently or intentionally made by the user 104, such as coughs, sneezes, laughter, snores, shouts, sounds of the user tapping their feet or hands, making sounds with an object (e.g., tapping a pencil or other object on a surface), fidgeting, walking, running, performing other movements, and so forth. The captured and analyzed audio data may also biometric data such as heartbeat, breathing, pulse, and so forth. Captured sounds of sobbing, screams, gasps, or other sounds, and/or accelerated heart rate, breathing, and so forth, may indicate duress.

Movement data, indicating movements of the user 104 and/or the user device 102, may be analyzed to determine a physical, emotional, and/or mental state of the user 104. For example, movement data indicating that the user 104 is jittery may indicate that the user 104 is stressed, tense, angry, or in some other emotional state. As another example, the walking movements, swaying, gestures (e.g., with hands, arms, wrists, and/or fingers), and/or other movements of the user 104 and/or the user device 102 may be characteristic of individuals who are intoxicated. The position(s), articulations (e.g., a flat hand, pointed finger, bend fingers, fist, or other configurations of body parts), and/or movements of hands, arms, wrists, and/or fingers may also indicate intoxication or some other state of the user 104. Facial movements, positions, and/or articulations may also be analyzed, such as facial tics, eyebrow movements, smiling or frowning, lip or tongue movement, eye movements, nostril flare, eyes open, shut, wide, or squinting, eyebrow position and/or movement, and so forth. Certain fidgeting motions, nervous motions, eye movements, and/or other movements that are atypical for the user may indicate a state of duress.

Movement data and/or location data may be employed to determine whether the user 104 is balanced or unbalanced, steady or unsteady, stumbling, falling over, or otherwise moving in an erratic manner, which may indicate a degree of intoxication, exhaustion, and/or mental impairment. Movement data describing the movement of a vehicle may be employed to determine the user's driving style, speed, level of alertness, and/or other characteristics which may indicate a presence or absence of intoxication, the user's emotional state, the user's level of fatigue, and/or other states. Movements that are atypical for the user may be used to infer that the user in currently in a state of duress.

Biometric data, indicating a physiological and/or health status of the user 104, may be generated and analyzed to determine the user's level of stress, anger, happiness, or other emotional states. As described above, biometric data may measure one or more of brain wave activity, blood pressure, heart rate, body temperature, perspiration, respiration rate, blood sugar level, and so forth. Such biometric data may also be analyzed to determine whether the user 104 is fatigued, awake, asleep, or in some other physical state. The biometric data may also be analyzed to determine whether the user 104 is intoxicated. Various physiological characteristics may be used to determine that the user is in a state of duress, including but not limited to elevated heart rate or pulse, elevated perspiration rate, elevated respiration rate, and so forth (e.g., elevated in comparison to the user's typical state for each physiological characteristic).

A user state 118 may include any combination of a physical, mental, and/or emotional state. For example, the generated data 114 may indicate that the user 104 is under duress, e.g., being threatened with physical harm if the user 104 does not submit the request 106 for account information presentation. Duress may be indicated by data 114 showing particular physical, emotional, and/or intellectual characteristics. A determination of duress may trigger an alteration of the account information 128 presented through the user device 102. A determination of duress may also trigger various action(s) 124, such as a notification to send assistance (e.g., policy, security guard, etc.) to the current location of the user 104, a notification to the user's emergency contact, indicating there may be a problem with the user 104, and so forth. Action(s) 124 may also include limiting the amount that the user 104 can withdraw from their account(s) while under duress.

In some implementations, the analysis module(s) 116 may employ other data, instead of or in addition to the sensor data 114, to determine the user state 118. In some examples, inputs (e.g., text input, clicks, swipes, other gestures, etc.) of the user 104 through an application executing on the user device 102 may be analyzed. For example, heightened emotions (e.g., anger, stress, etc.) may lead to more misspellings or grammar errors, use of different vocabulary (e.g., obscenities), use of a higher proportion of shorter words, different punctuation, and so forth. A change in the emotional state of the user 104 may also lead to a change in typing speed, a change in the frequency of clicks, or other changes in gestures made to a user interface. The analyzed text data may be entered by the user 104 in through a user interface of the application, in a chat and/or instant messaging (IM) session, as an email, or otherwise. In some instances, characteristics of the text such as misspellings, input speed, vocabulary, and so forth may indicate that the user 104 is intoxicated.

In some implementations, the management engine 110 may employ the user state 118 to determine how or whether to alter the account information 128 for presentation, and/or to determine one or more actions 124 to be taken. In some implementations, the management engine 110 may determine action(s) 124 based on the user state 118 and information in a user profile 120 associated with the user 104, such as the constraint information 122 describing one or more constraint rule(s) that govern the account information presentation and/or other action(s) 124. In some instances, the user 104 may have previously specified the constraint rule(s) prior to submitting the request 106.

In some implementations, the analysis module(s) 116 may communicate with and/or include one or more predictive modules 126. The predictive module(s) 126 may employ any suitable data analytic technique(s), including machine learning (ML) techniques, to predict a normal or typical (not under duress) state of the user 104. Such state predictions may be made based on historic biometric data collected for the user 104, which is analyzed to develop a baseline state that is a normal or typical (non-duress) state of the user 104. The predictive module(s) 126 may generate and maintain a physiological model for the user 104 that describes the user's normal or typical physiological state, such as typical heart rate, perspiration, eye movement, speech patterns, and so forth. Deviations from the model, if current biometric data differs from the model, may lead to a determination of a state of duress, and may trigger the alteration of account information for presentation, and/or other action(s) 124 to be taken.

Implementations support various ways in which account information 128 can be altered for presentation, in response to determining that the user 104 is under a state of duress. For example, in instances where the user 104 owns multiple accounts with an institution, such as a checking account, savings account, money market account, investment account, and so forth, altering the account information 128 may include presenting the account information for only one of the account(s) and/or for a subset of the owned accounts. As a particular example, the presentation may be limited to the account information for the checking account, such as its balance, recent transactions, and so forth. As another example, altering of account information 128 can include changing or otherwise obfuscating account identification information, such as account numbers. Altering of account information 128 can also include presenting wholly fictitious accounts that are not those of the user 104. Altering of account information 128 can also include presenting fictitious information for existing accounts, such as lower-than-actual account balances, and/or altered transaction history with the omission of transaction(s), altering transaction amount(s) or parties, addition of fictitious transaction(s), and so forth. Other types of account information alteration may also be performed, as appropriate, to attempt to mitigate the amount of loss that the user 104 may experience while under duress.

FIG. 1A depicts an example in which the user 104 is requesting the presentation of account information through their user device 102 (e.g., smartphone). FIG. 1B depicts an example in which the user 104 is requesting the presentation of account information through some other type of device, such as the ATM 130 shown in FIG. 1B. Other such (e.g., public) devices may include, but are not limited to, payment or information kiosks, vending machines, rentable vehicles or other rentable apparatus, and so forth. In the example of FIG. 1B, the request 106 is submitted through the ATM 130, and the management engine 110 determines the account information 128 that is sent to the ATM 130 and displayed on the ATM 130. As described herein, the account information 128 may be altered based on a determination that the user 104 is under duress. The duress determination may be based at least partly on data received from the sensor(s) 112(1) in the user device 102 along with the other sensor(s), even though the account information 128 is not being presented on the user device 102 in this example. Moreover, in some instances the ATM 130 may also include one or more sensor(s), such as a camera, microphone, and so forth, that generates and sends sensor data 114 for analysis by the analysis module(s) 116.

In some implementations, the user 104 may be authenticated based on various credentials provided by the user 104, such as a username, password, personal identification number (PIN), and so forth. The authentication may also be based on the collected biometric data, which is compared to the baseline model of the user 104 to confirm their identity. The authentication may be performed by the management device(s) 108 prior to the sending of the request 106, or the request 106 may include credentials used to authenticate the user 104.

Figure 2:
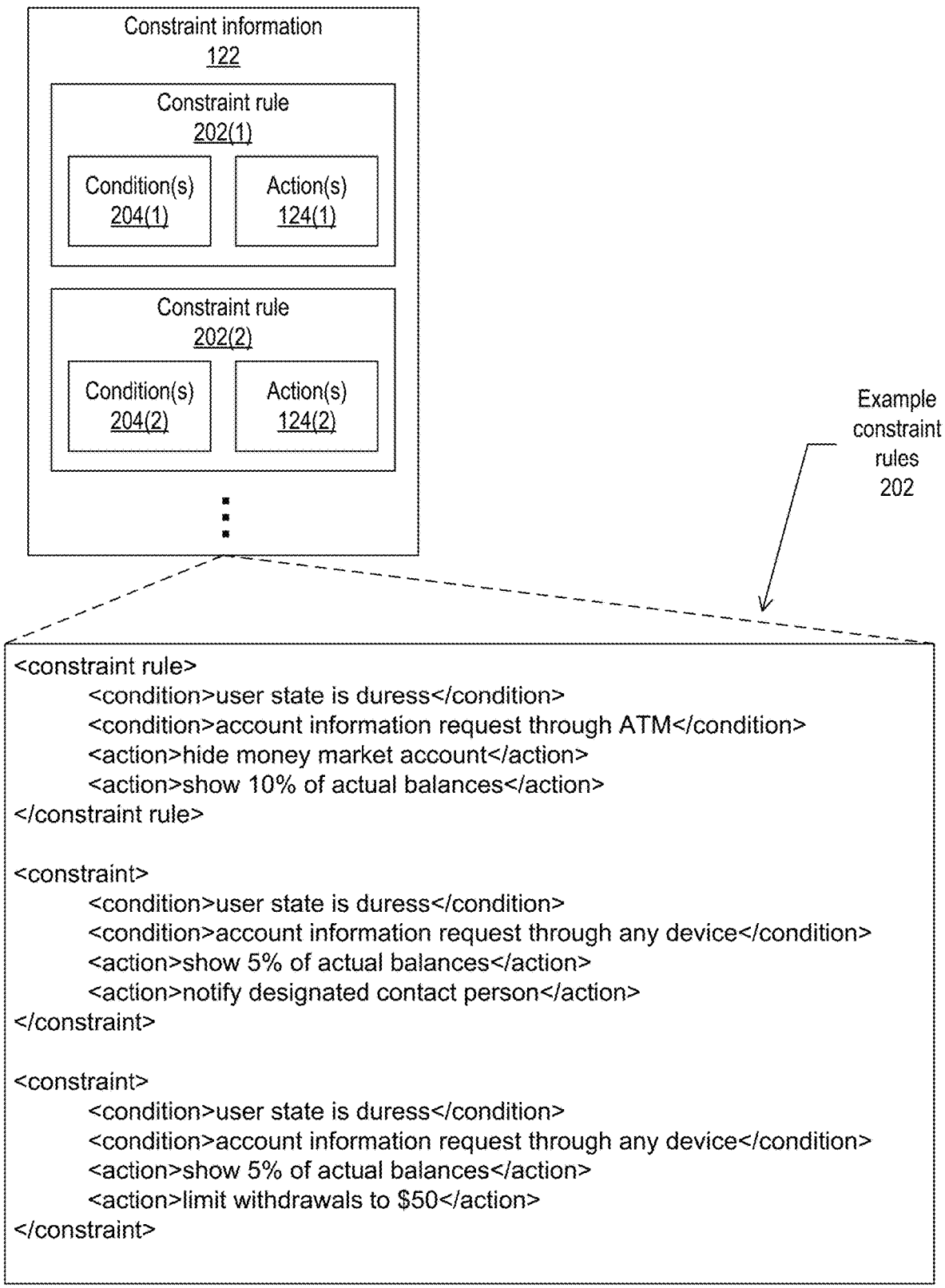
FIG. 2 depicts an example of constraint information that may be employed to manage account information presentation, according to implementations of the present disclosure.

FIG. 2 depicts an example of constraint information 122 that may be employed to manage the presentation of account information 128 for a user 104, according to implementations of the present disclosure. As shown in the example of FIG. 2, the constraint information 122 may include any appropriate number of constraint rules 202 (e.g., constraint rules (1) and 202(2)). Each constraint rule 202 may include one or more conditions 204 (e.g., conditions 204 (1) and 204(2)) to determine whether the constraint rule 202 has been triggered, and one or more actions 124 (e.g., actions 124(1) and 124(2)) to be performed if the constraint rule 202 has been triggered. In some instances, the condition(s) 204 may include: state-related condition(s) that are based on the user state 118, such as whether the user 104 is under duress, condition(s) based on the current location of the user 104, condition(s) based on date and/or time, conditions based on the type of requesting device, and so forth. In some implementations, the constraint information 122 may include a set of one or more constraint rules 202 for each of multiple users 104. In such instances, a constraint rule 202 may identify the particular user(s) 104 that are subject to the constraint rule 202.

In some instances, a constraint rule 202 may include a combination (e.g., logical combination) of state-related condition(s) and/or other types of condition(s). For example, as shown in the example constraint rules 202 included in FIG. 2, a constraint 202 may indicate that actions are to be taken if the user 104 is currently in a state of duress and if the request 106 is submitted through an ATM. As another example, a constraint rule 202 may indicate that actions are to be taken if the user 104 is currently in a state of duress and if the request 106 is submitted through any type of public device (e.g., ATM, kiosk, vending machine, etc.). As another example, a constraint rule 202 may indicate that actions are to be taken if the user 104 is currently in a state of duress and if the request 106 is submitted while the user 104 (e.g., the user device 102) is in a location that is outside the user's home. Other types of suitable combinations are also available to implementations.

Although FIG. 2 depicts example constraint rules 202 that are described using metadata tags in a form of markup language, implementations are not limited to this example. Implementations support the use of any appropriate format for describing the constraint rule(s) 202 in the constraint information 122. Moreover, in some implementations the constraint rule(s) 202 may include dynamic variables in addition to or instead of static variables.

A constraint rule 202 may include information indicating how multiple condition(s) 204 are to be logically combined to determine whether the constraint rule 202 is violated. For example, the presence of multiple condition(s) A, B, and C in a constraint rule 202 may indicate that the associated action(s) 124 are to be performed if the logical combination (A AND B AND C) is satisfied. In some implementations, multiple condition(s) 204 may be combined with an OR operator. In some implementations, the constraint rule 202 may include one or more logical operators indicating how multiple condition(s) 204 are to be combined to apply the constraint rule 202.

The constraint rule 202 may indicate one or more actions 124 to be performed if the condition(s) 204 in a constraint 202 are satisfied. The action(s) performed is the condition(s) are satisfied may include actions to alter the presented account information, and/or other types of actions (e.g., sending notification(s), imposing withdrawal limits, etc.).

The action(s) 124 may include, but are not limited to, one or more of the following.

The action(s) 124 may include altering the account information that is presented to the user 104, such as presenting a list of accounts that are a subset of the actual accounts owned by the user 104, changing the account balance(s) and/or transaction history, altering account identifiers such as account numbers, providing fictitious account information, such as randomly generated accounts including account balances and/or transaction history within a predetermined range of possibilities, and so forth.

Action(s) 124 may include sending a notification to the user 104 and/or other individual(s), describing the state of duress that the user is in, and describing the request for presentation of account information. In some implementations, another individual may be notified that the user 104 has initiated a transaction that violates or is contrary to one or more constraint rules 202. The notification may include appropriate information to enable the other individual to assist the user 104. For example, the notification may identify the user 104, indicate the user's location, describe the current user state 118 of the user 104, describe the request 106 that has been submitted, and/or other information. The notification may be communicated to the user 104 and/or other individual(s) using various techniques, such as email, text message, voice message, and so forth. In some examples, the user 104 may have previously indicated other individual(s) to receive notification(s), e.g., as emergency contact information stored in the user profile 120. For example, the user 104 may have indicated a spouse, guardian, adult child, sibling, other relative, caregiver, doctor, attorney, accountant, trust manager, trust management service, business partner, colleague, or other(s). In some examples, the other individual(s) may have been selected an entity other than the user 104. For example, the other individual(s) may include a court-appointed guardian or caretaker.

Action(s) 124 may also include blocking a requested purchase, balance transfer, and/or other requested transaction so that it does not proceed. In instances where the transaction has already been initiated, the transaction 106 may be discontinued and/or rolled back to a previous state. Action(s) 124 may include delaying the transaction for a predetermined period of time.

Action(s) 124 may include administering a test to the user 104, e.g., through the user device 102, to determine whether the user 104 is actually under duress. For example, to check whether a user 104 is under duress, the user 104 may be asked to speak a phrase which is captured by audio sensor device(s) and analyzed to determine whether the user 104 is speaking calmly. The phrase may be innocuous enough so as not to alert the malicious individual to the test. As another example, the user 104 may be given the opportunity to speak a word or phrase that the user has previously indicated as a trigger to confirm that they are actually under duress and need assistance. The trigger word or phrase may be stored in the user profile 120, and may be configurable by the user 104.

Figure 3:
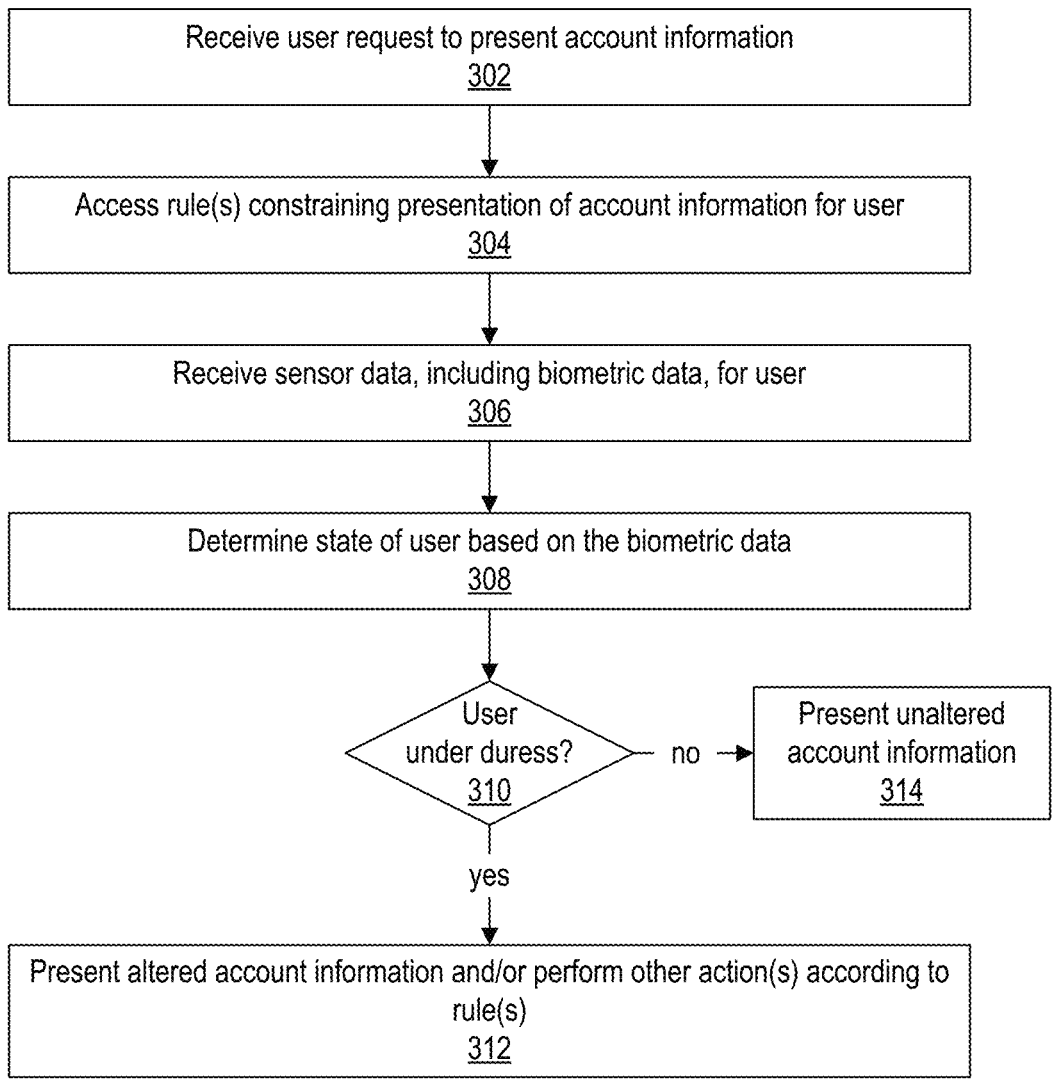
FIG. 3 depicts a flow diagram of an example process for managing account information presentation, according to implementations of the present disclosure.

FIG. 3 depicts a flow diagram of an example process for managing account information presentation for a user 104, according to implementations of the present disclosure. Operations of the process may be performed by one or more of the analysis module(s) 116, the management engine 110, and/or other software modules executing on the management device(s) 108, the user device 102, or elsewhere.

A request 106 to present account information 128 may be received (302), as described above, submitted through the user device 102, through an ATM 130, or through some other device. The request 106 may be submitted following user authentication, in some examples.

The constraint information 122 of the user 104 may be accessed (304), to retrieve the various constraint rules that may be applicable.

The sensor data is received (306), including biometric data that describes a current physiological state of the user 104 when they submitted the request 106. The received data may include sensor data 114 generated by the sensor device(s) 112, as described above. The data may also include other information, such as text, gestural inputs (e.g., clicks, double-clicks, swipes, pinches, etc.), voice input, haptic input, brain waves, eye movement, facial expressions, and/or other inputs made by the user 104 through an interface of the user device 102. The data received may also include a current location of the user 104 and/or user device 102.

The user state 118 may be determined (308) for the user 104 as described above. In some implementations, the user state 118 is determined in real time with respect to the generation of the data, such that the user state 118 is a current state of the user 104 at or near the time when the data was generated (e.g., during a time period that includes the time when the data was generated). Moreover, the user state 118 that is determined may be the state of the user 104 during a time period that includes a time when the user 104 submits the request 106. Accordingly, the user state 118 may be a current state of the user 104 at or near the time of the request submission. Real time operations may include operations that are automatically executed, without requiring human input and without any intentional delay, taking into account the processing limitations of the computing system(s) performing the operations and the time needed to perform the operations. The data, such as the sensor data 114 describing the user 104, may be analyzed in real time with respect to the generation of the data. For example, there may be no intentional delay between the generation of the data and the analysis of the data, beyond the latency incurred in communicating the data over network(s) and performing the analysis operations on computing system(s). In some implementations, the user state 118 of the user 104 at various times may be stored and accessed later to determine trends and/or patterns in the user state 118 over time. The determined trends and/or patterns may be used to predict likely and/or possible future states of the user 104.

Based on the current user state 118, a determination is made (310) whether the user 104 is under duress when submitting the request 106. If so, the account information may be altered (312) for presentation and/or other action(s) may be performed as described above. If not, the unaltered (e.g., actual) account information for the user 104 may be presented (314) per the user's request 106. Account information alteration and/or other action(s) may be performed as specified by the constraint information 122, as described above.

In some implementations, the generation of the sensor data 112 may be initiated (e.g., triggered) in response to the indication of a request 106 or of a possible request 106. For example, sensor data collection may begin when the user 104 submits the request 106, and/or when the user 104 approaches an ATM or other public device in preparation for submitting the request 106. Alternatively, the sensor data 112 may be collected substantially continuously, and stored (for at least a period of time), and the request 106 may trigger the retrieval and analysis of stored data that was collected during a time period (e.g., a 5-minute window) when the request 106 was submitted.

In some implementations, the determination of the current user state 118 may be through comparison to an average or typical state of the user 104. For example, sensor data 112 may be generated for the user 104 over a period of time that includes various times of day, days of the week, and so forth. The data may be analyzed to determine a baseline (e.g., typical or average) physical, mental, and/or emotional state for the user 104. A subsequently determined user state 118 may be relative to the baseline state. For example, a user 104 may be determined to be under duress if the current state 118 exhibits more heightened than normal physiological characteristics such as high heart rate, respiration rate, stress markers in the user's voice, and so forth. In some implementations, a determination of duress may be based on a determination that one or more measurements of current physiological characteristics of the user 104 exceed predetermined thresholds, thus indicating an atypical value for these characteristics. For example, a combination of above-threshold heart rate, above-threshold perspiration levels, above-threshold respiration rate, above-threshold frequency of fidgeting movements, above-threshold frequency of stress markers in the user's voice, and/or other indications may be used to infer that the user 104 is under duress.

In some implementations, the alteration of the account information may be performed at the management device(s) 108, such that the altered account information 128 is communicated to the requesting device for presentation thereon. In such instances, altering the account information 128 that is communicated over the network(s) to the requesting device may reduce network bandwidth consumption. In some implementations, the alteration of the account information may be performed on the requesting device prior to presenting the account information. In such instances, the management device(s) 108 may send the account information 128 with a signal indicating duress, to instruct the requesting device to perform the alteration(s) prior to presentation. In such implementations, the constraint information may be stored on the requesting device and/or accessed by the requesting device to determine how the account information is to be altered.

Although some examples herein describe a visual presentation of account information (e.g., altered or unaltered), implementations are not limited to visual presentations. In some implementations, the account information may be presented at least in part through audio output, haptic output, and/or other types of output that is perceivable by a user 104. Accordingly, account information may be altered prior to presentation through the one or more presentation modules. For example, an audio output of an account balance may be altered to recite a lower balance than the account's actual balance, in instances when duress is detected. The UI that outputs the information as an altered version of the account information may be executing as a component of a conversational user interface (CUI) that receives voice and/or other types of input commands from the user, and that outputs information using a speech generation module instead of or in addition to outputting information visually. In such examples, the biometric data that is collected and analyzed to determine the user state can include face and/or body images of the user and/or others in proximity to the user at the time of the request, voice print information for the user and/or others in proximity, body temperature and/or heart rate information for the user and/or others in proximity, and so forth.

Although examples herein describe the alteration of (e.g., financial) account information for a user based on a determination of the user state, such as altering account balances and so forth, implementations are not limited to these examples. In some implementations, other types of sensitive information can be obfuscated, hidden, omitted, or otherwise altered based on the determined user state. Such sensitive information can include, but is not limited to, personally identifiable information (PII) of the user, health and/or medical care information for the user, and so forth. In some examples, the altered information that is present can be limited to the particular information that is needed for a particular transaction requested by the user, but other information may be omitted from and/or altered in the presentation of the information of the user.

Figure 4:
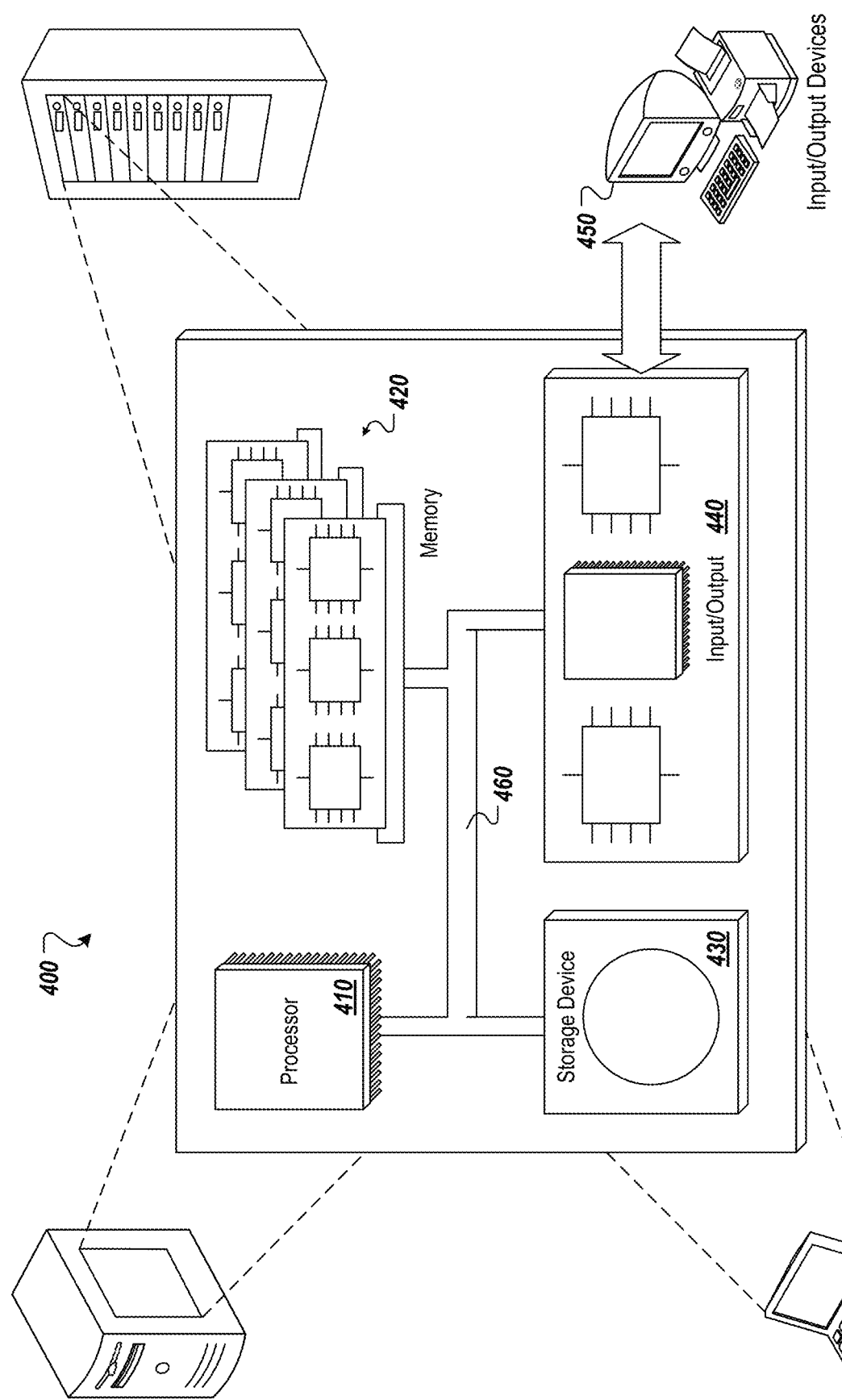
FIG. 4 depicts an example computing system, according to implementations of the present disclosure.

FIG. 4 depicts an example computing system, according to implementations of the present disclosure. The system 400 may be used for one or more of the operations described with respect to the various implementations discussed herein. For example, the system 400 may be included, at least in part, in one or more of the user device 102, the management device(s) 108, or other computing device(s) described herein. The system 400 may include one or more processors 410, a memory 420, one or more storage devices 430, and one or more input/output (I/O) devices 450 controllable through one or more I/O interfaces 440. The various components 410, 420, 430, 440, or 450 may be interconnected through at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any suitable number of volatile memory units and/or non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any suitable type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more networks using any suitable network protocol.

Computing devices of the system 400 may communicate with one another, or with other computing devices, using one or more networks. Such networks may include public networks such as the internet, private networks such as an institutional or personal intranet, or any combination of private and public networks. The networks may include any suitable type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include one or more computing devices of any suitable type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and/or processor(s) of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method comprising:
receiving, by a first device that is operating in a normal operating mode in which requests that are locally initiated by users at the first device are communicated over a network to a second device for completion and that result in generation and output of accurate transaction data by the second device upon completion of a request, data indicating that a particular user has initiated a particular request;
obtaining, by the first device, sensor data that is generated by one or more sensors of the first device proximate to a time that the particular user initiated the particular request;
classifying, by the first device and using the sensor data, the particular request as a particular type of request;
wherein classifying the particular request as the particular type of request comprises:
identifying, within the sensor data, a first particular type of sound or speech from the particular user;
determining that the first particular type of sound or speech includes a positive indication of duress;
in response to determining that the first particular type of sound or speech includes a positive indication of duress, confirming the user is under duress by requesting that the user speak a particular phrase;
receiving a second particular type of sound or speech from the user speaking the particular phrase; and
determining from the second particular type of sound or speech from the user speaking the particular phrase that the user is under duress;
in response to determining that the particular request is classified as the particular type of request, initiating, by the first device, an exception processing mode in which requests that are initiated by the users at the first device are not communicated over the network to the second device and that result in the generation and output of inaccurate completion data by the first device to mimic completion of the request by the second device;
processing, by the first device, the particular request using the exception processing mode; and
providing, for output by the first device, the inaccurate completion data generated by the first device for the particular request.

2. The method of claim 1, wherein classifying the particular request as the particular type of request further comprises determining that the sensor data deviates from second sensor data that was generated by the one or more sensors at a different time prior to the time that the particular user initiated the particular request.

3. The method of claim 1, wherein classifying the particular request as the particular type of request further comprises determining a characteristic of the user at the time that the user initiated the particular request.

4. The method of claim 1, wherein classifying the particular request as the particular type of request further comprises determining that the sensor data deviates from a baseline set of sensor data.

5. The method of claim 1, wherein the sensor data comprises one or more of image data, video data, or audio data.

6. The method of claim 1, wherein classifying the particular request as the particular type of request further comprises identifying, within the sensor data, one or more particular types of motions of the particular user.

7. The method of claim 1, further comprising in response to determining that the particular request is classified as the particular type of request, providing, for output by the first device, an input request for a particular type of input from the particular user.

8. The method of claim 1, wherein the inaccurate completion data comprises a falsification of a particular type of data requested by the particular user in the particular request.

9. The method of claim 1, wherein the first device is an automated teller machine (ATM).

10. The method of claim 1, wherein the exception processing mode further comprises preventing, by the first device, at least one operation requested by the user in the particular request.

11. The method of claim 10, wherein the particular request comprises a withdrawal of funds or a peer-to-peer electronic transfer of funds.

12. The method of claim 1, wherein the inaccurate completion data comprises randomly generated account information.

13. The method of claim 1, wherein the inaccurate completion data comprises fictitious account information.

14. A system comprising:
one or more computers and one or more storage devices storing instructions that are
operable, when executed by the one or more computers, to cause the one or more computers to perform operations comprising:
receiving, by a first device that is operating in a normal operating mode in which requests that are locally initiated by users at the first device are communicated over a network to a second device for completion and that result in generation and output of accurate transaction data by the second device upon completion of a request, data indicating that a particular user has initiated a particular request;
obtaining, by the first device, sensor data that is generated by one or more sensors of the first device proximate to a time that the particular user initiated the particular request;
classifying, by the first device and using the sensor data, the particular request as a particular type of request;
wherein classifying the particular request as the particular type of request comprises:
identifying, within the sensor data, a first particular type of sound or speech from the particular user;
determining that the first particular type of sound or speech includes a positive indication of duress;
in response to determining that the first particular type of sound or speech includes a positive indication of duress, confirming the user is under duress by requesting that the user speak a particular phrase;
receiving a second particular type of sound or speech from the user speaking the particular phrase; and
determining from the second particular type of sound or speech from the user speaking the particular phrase that the user is under duress;
in response to determining that the particular request is classified as the particular type of request, initiating, by the first device, an exception processing mode in which requests that are initiated by the users at the first device are not communicated over the network to the second device and that result in the generation and output of inaccurate completion data by the first device to mimic completion of the request by the second device;
processing, by the first device, the particular request using the exception processing mode; and
providing, for output by the first device, the inaccurate completion data generated by the first device for the particular request.

15. The system of claim 14, wherein classifying the particular request as the particular type of request further comprises determining that the sensor data deviates from second sensor data that was generated by the one or more sensors at a different time prior to the time that the particular user initiated the particular request.

16. The system of claim 14, wherein classifying the particular request as the particular type of request further comprises determining a characteristic of the user at the time that the user initiated the particular request.

17. The system of claim 14, wherein the inaccurate completion data comprises a falsification of a particular type of data requested by the particular user in the particular request, and
wherein the exception processing mode further comprises preventing, by the first device, at least one operation requested by the user in the particular request.

18. The system of claim 14, wherein the operations further comprise: in response to determining that the particular request is classified as the particular type of request, providing, for output by the first device, an input request for a particular type of input from the particular user.

19. The system of claim 14, wherein classifying the particular request as the particular type of request further comprises identifying, within the sensor data, one or more particular types of motions of the particular user.

20. One or more non-transitory computer storage media encoded with computer program instructions that when executed by one or more computers cause the one or more computers to perform operations comprising:
receiving, by a first device that is operating in a normal operating mode in which requests that are locally initiated by users at the first device are communicated over a network to a second device for completion and that result in generation and output of accurate transaction data by the second device upon completion of a request, data indicating that a particular user has initiated a particular request;
obtaining, by the first device, sensor data that is generated by one or more sensors of the first device proximate to a time that the particular user initiated the particular request;
classifying, by the first device and using the sensor data, the particular request as a particular type of request;
wherein classifying the particular request as the particular type of request comprises:
identifying, within the sensor data, a first particular type of sound or speech from the particular user;
determining that the first particular type of sound or speech includes a positive indication of duress;
in response to determining that the first particular type of sound or speech includes a positive indication of duress, confirming the user is under duress by requesting that the user speak a particular phrase;
receiving a second particular type of sound or speech from the user speaking the particular phrase; and
determining from the second particular type of sound or speech from the user speaking the particular phrase that the user is under duress;
in response to determining that the particular request is classified as the particular type of request, initiating, by the first device, an exception processing mode in which requests that are initiated by the users at the first device are not communicated over the network to the second device and that result in the generation and output of inaccurate completion data by the first device to mimic completion of the request by the second device;

processing, by the first device, the particular request using the exception processing mode; and providing, for output by the first device, the inaccurate completion data generated by the first device for the particular request.

* * * * *